J. M. WASHBURN.
DISTANCE FINDER.
APPLICATION FILED SEPT. 13, 1911.
1,033,850.
Patented July 30, 1912.
5 SHEETS—SHEET 3.
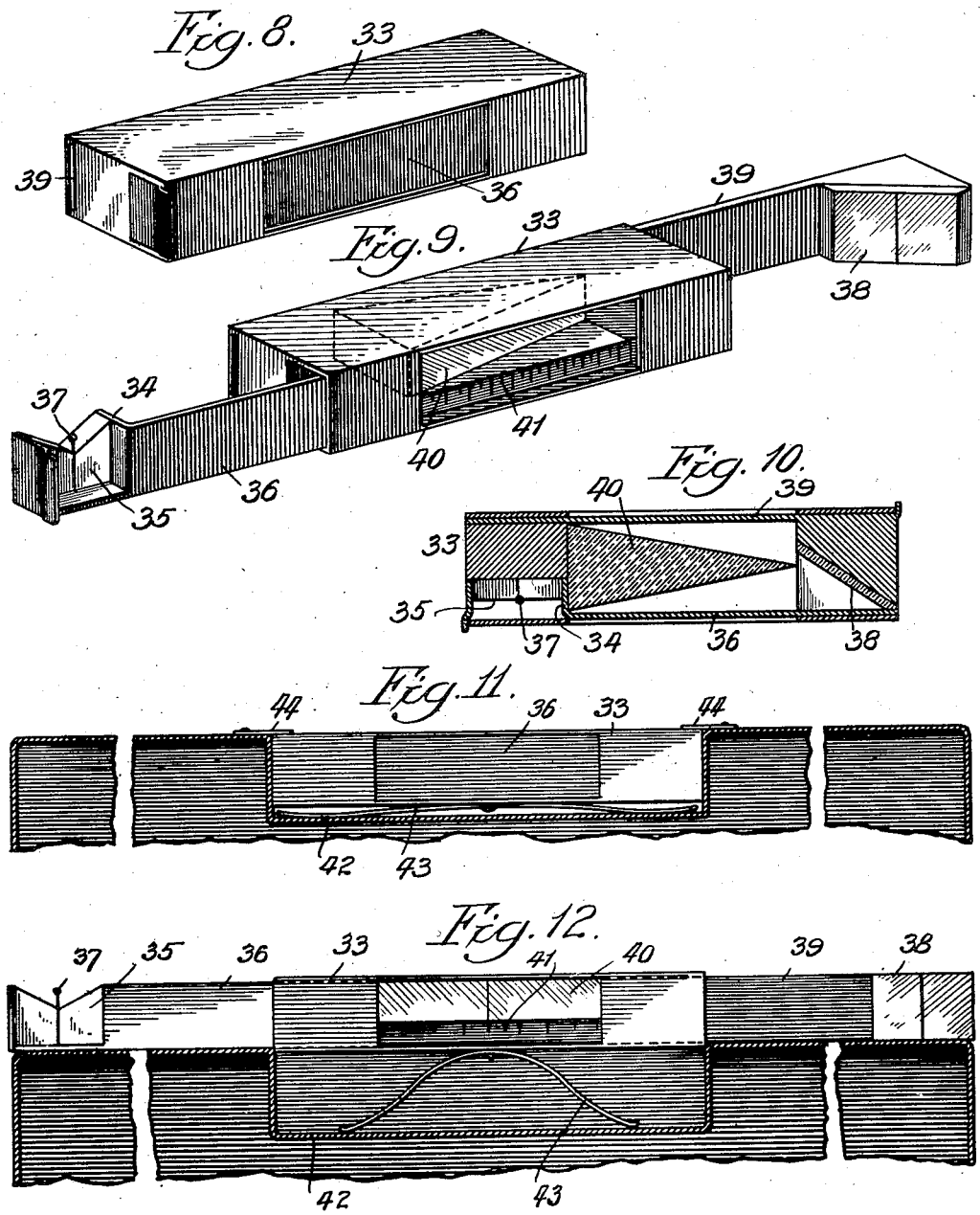

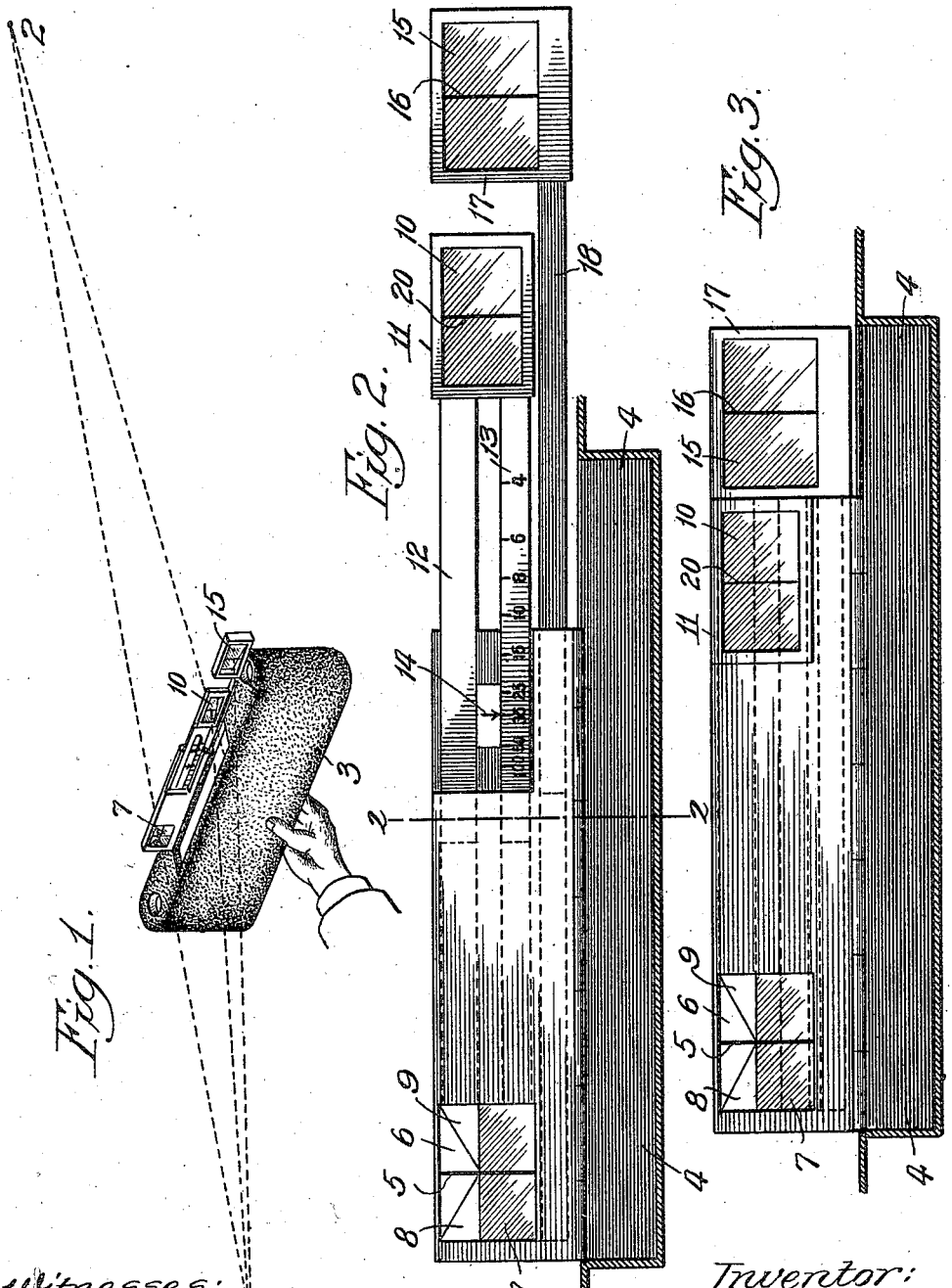

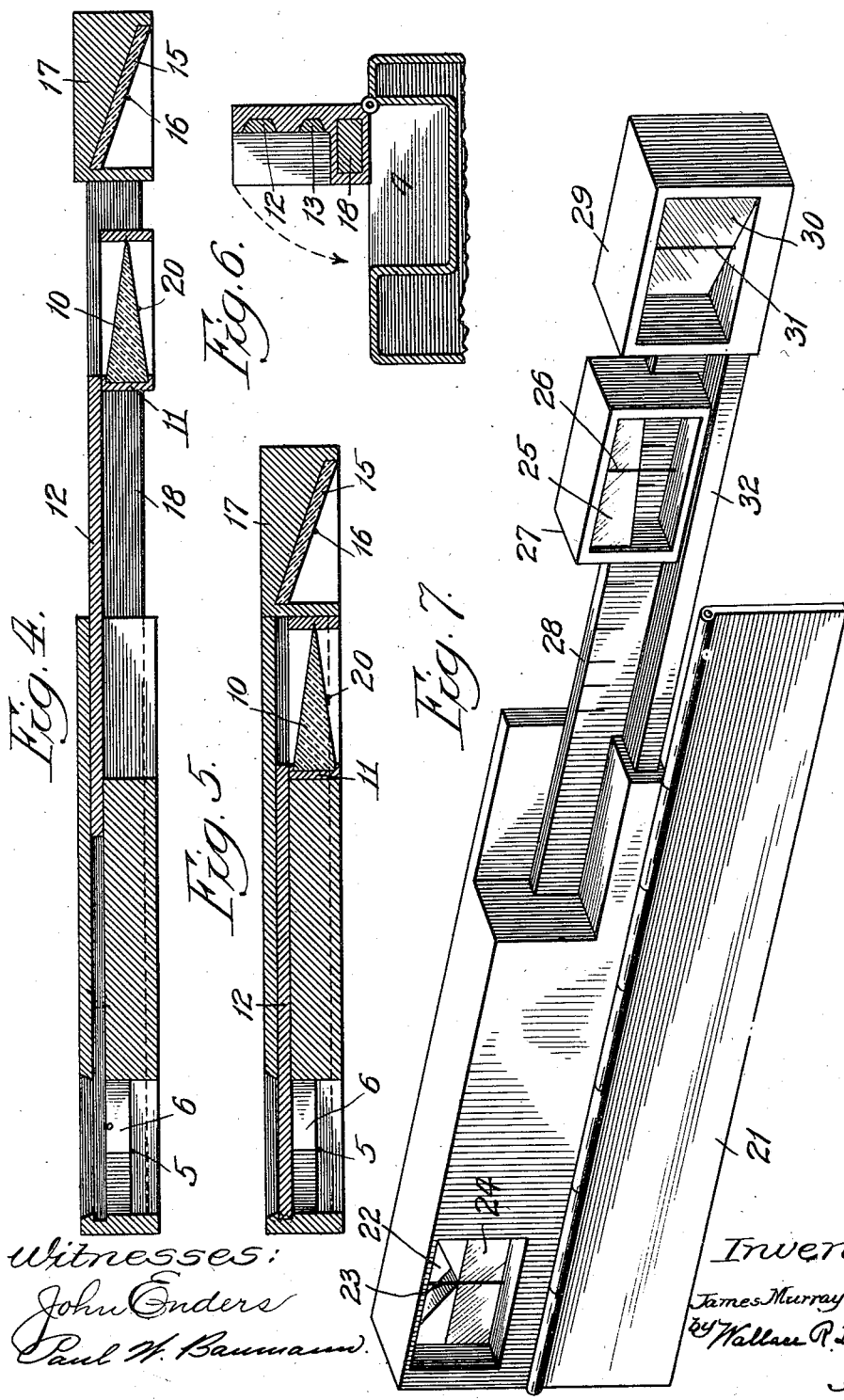

J. M. WASHBURN.
DISTANCE FINDER.
APPLICATION FILED SEPT. 13, 1911.
1,033,850.
Patented July 30, 1912.
5 SHEETS—SHEET 4.
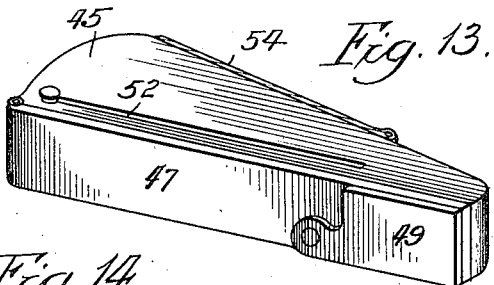
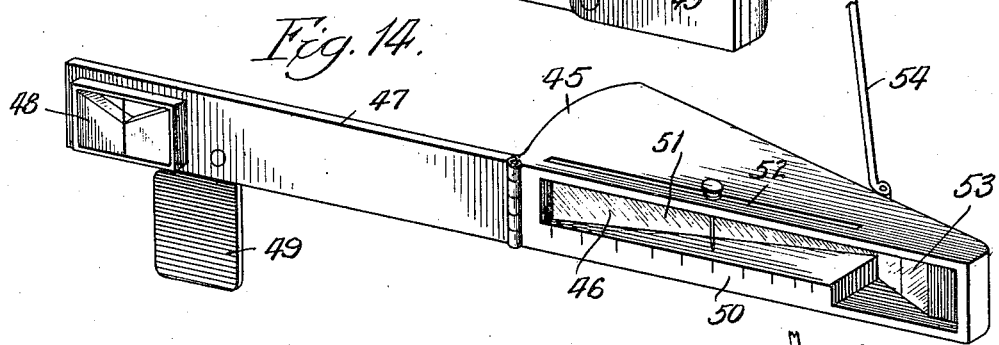
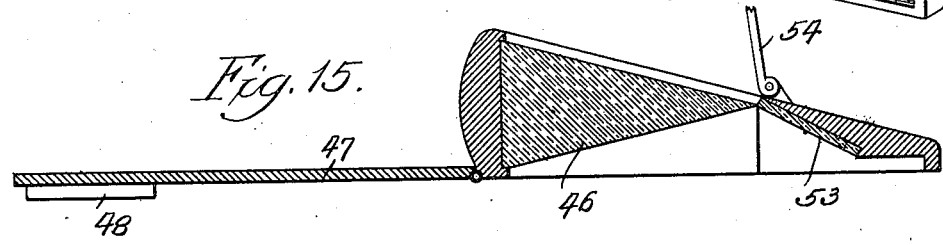
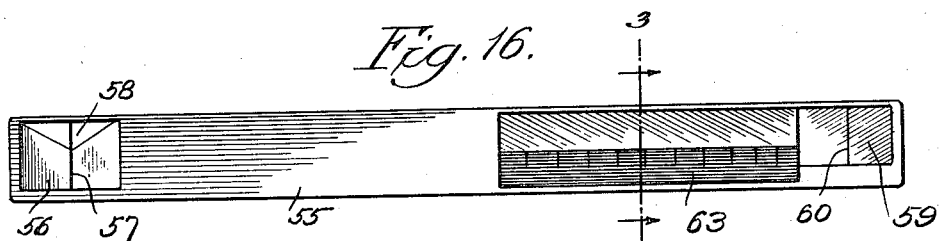
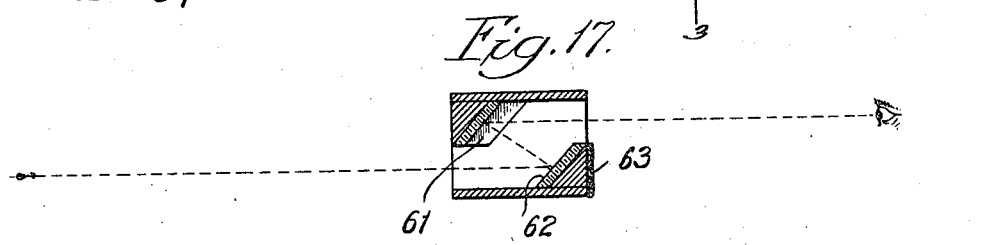
Witnesses:
John Enders
Paul W. Baumann
Inventor:
James Murray Washburn,
by Wallace R. Lane
Atty

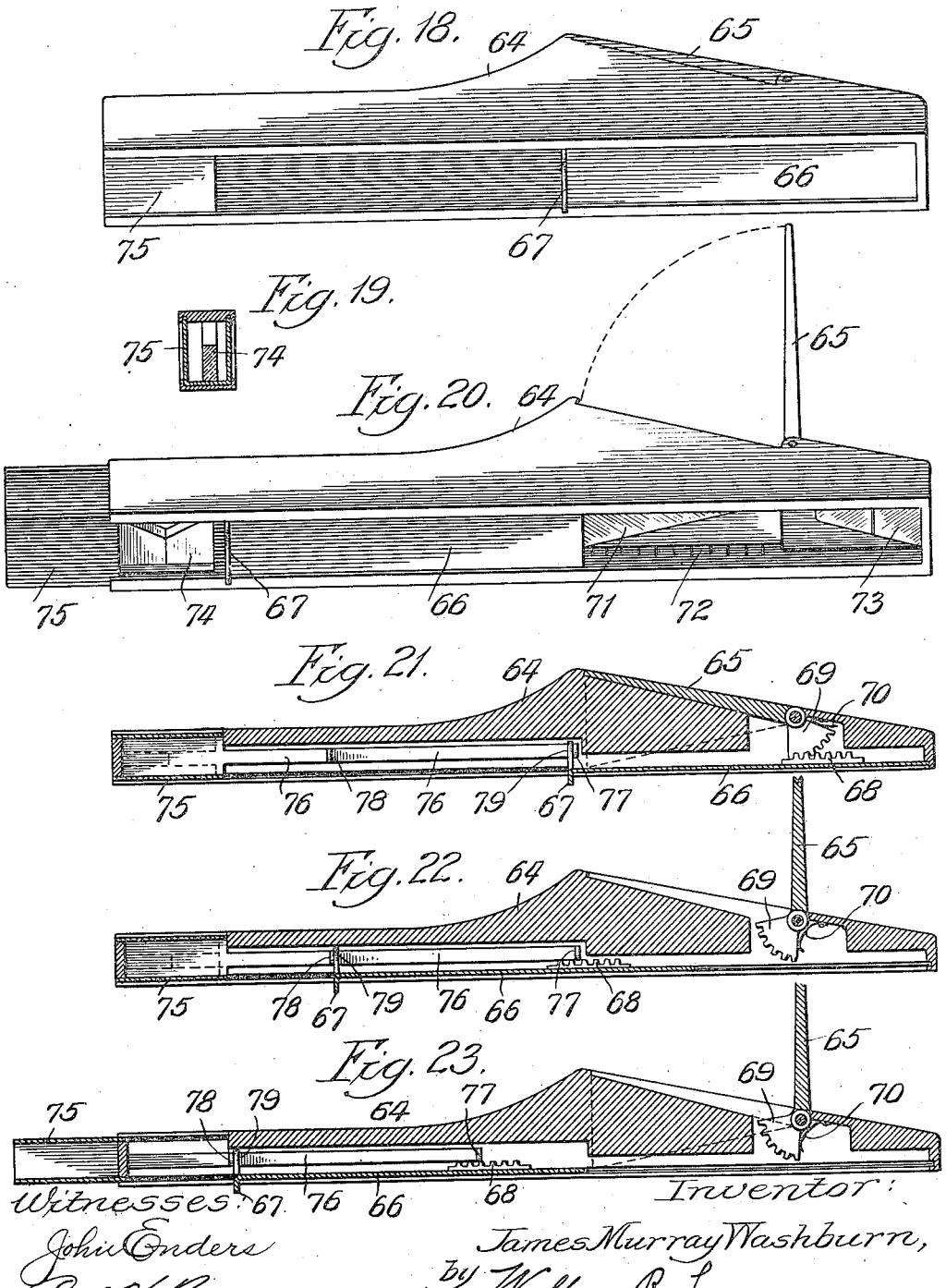

UNITED STATES PATENT OFFICE.

JAMES MURRAY WASHBURN, OF CHICAGO, ILLINOIS.

DISTANCE-FINDER.

1,033,850.

Specification of Letters Patent.

Patented July 30, 1912.

Application filed September 13, 1911. Serial No. 649,088.

*To all whom it may concern:*

Be it known that I, JAMES MURRAY WASHBURN, a citizen of the United States, residing at Chicago, county of Cook, State of Illinois, have invented certain new and useful Improvements in Distance-Finders, of which the following is a specification.

It is the object of the present invention to provide an apparatus suitable for indicating directly, and without any mathematical calculations, the distance to an object; to provide a device capable of transmitting to the eye of the observer light rays emanating divergently from a distant object and then, by suitable measurement of the angular relation of the divergent rays, indicating directly, in linear units, the distance from the apparatus, or from the observer's eye, to the distant object; to provide a distance finder having a sight bar arranged for location at a definite predetermined distance from the eye of the observer and equipped with a prism, or other light-deflecting device, whereby divergent rays from a distant object may be transmitted to the eye of the observer and may be made to show to the observer the distance in feet to the object. In acccomplishing these ends, the prism, or other light-deflecting device, may be stationary, or may be adjustable, and, in other respects, the instrument or apparatus may be varied in structure.

Several specific embodiments are illustrated in the accompanying drawing, but, throughout all these species, the basic idea prevails.

The device is well adapted for use as an adjunct to a hand-camera, but its operation is not limited to this specific use, nor to the art of photography alone. In general, the greatest utility is to be found in determining moderate distances, say, from four to one hundred feet.

In the accompanying drawings, Figure 1 is a perspective view of a hand-camera equipped with a distance finder, this figure showing diagrammatically in dotted lines the paths of light from an object through the distance finder to the eye of the observer; Fig. 2 is an elevation of the structure shown in Fig. 1 with the receiving-box or tray shown in section; Fig. 3 shows the distance finder with its movable parts pushed in so that the sight bar can be folded down into the receiving tray; Fig. 4 is a sectional plan of the structure shown in Fig. 2, and Fig. 5 is a similar figure after the telescoping parts have been pushed together; Fig. 6 is a section through the structure of Fig. 2 along the dotted line 2—2; Fig. 7 shows a modified structure of massive design, wherein the light-deflecting prism rides on a calibrated bar which can be pulled out to form an extension to the sight bar; Fig. 8 is a perspective view of a third modification, wherein the light-deflecting prism is stationary; Fig. 9 shows the structure of Fig. 8 in its open and operative condition; Fig. 10 is a sectional plan through the center of the structure shown in Fig. 8; Fig. 11 is a fragmentary section through a camera box showing still another modification of the distance finder folded into small compass and concealed in a depression in the top of the box; Fig. 12 shows the distance finder of Fig. 11 expanded into operative condition and extending along the top of the camera box; Fig. 13 is a perspective view of still another modification, wherein all the glass parts are concealed; Fig. 14 is similar to Fig. 13, but shows the working parts unfolded to operative position; Fig. 15 is a sectional plan through the structure shown in Fig. 14; Fig. 16 is a modification of simple design, not adapted for folding, and containing reflecting mirrors set at such angles with respect to one another as to serve the general function of the prisms used in the other modifications; Fig. 17 is a section along the line 3—3 of Fig. 16 illustrating the passage of light through the device; Fig. 18 illustrates a modification wherein the sight bar is of rigid construction and wherein doors close up to cover the delicate parts of the instrument; Fig. 19 is a detail of the sheet metal box appearing at the left-hand end of Fig. 18 and used to protect the sight of the distance finder; Fig. 20 shows the instrument with its apertures open, ready for the transmission of light; Fig. 21 is a sectional plan through the structure of Fig. 18 this section being taken below the prism and angular mirror; Fig. 22 shows the structure with the prism uncovered, but with the sight still enveloped in the sliding metal box; and Fig. 23 is a section showing the structure completely open and in position for use, as illustrated in the perspective view of Fig. 20.

In Fig. 1, the eye of the observer is represented diagrammatically at 1, and the distant object is indicated diagrammatically at 2. A hand-camera 3, held in the hand of the observer, carries, embedded in its top, a tray or receptacle 4, from which the distance finder may be folded up about a hinge into a vertical position.

The distance finder comprises a sight bar so equipped that divergent rays of light, coming from the distant object 2, are deflected to the eye of the observer at 1. The bar is also equipped with a scale, so calibrated that the observer can read off directly therefrom the distance in feet, or other linear units, to the object at 2.

In the structure shown in Figs. 1 to 6, inclusive, the sight bar carries at its left-hand end a box or recess sheltering a hair-line 5 and having a triangular opening 6 bisected by that line, through which opening the observer may look directly at the distant object at 2. The hair-line 5 passes across the center of a mirror 7 and serves as a means for adjusting the camera into proper angular position with respect to the direct line of sight from the eye to the object. It will be understood that when the eye of the observer appears reflected in mirror 7 and is there bisected by the line 5, the camera will be at right angles to the line of sight. Triangular metal plates 8 and 9 are placed above mirror 7 and serve to limit the size of the sight opening 6, this being of material advantage in securing a direct alinement with the distant object.

A prism 10 is provided for the sight bar and is carried in a suitable box 11, mounted on legs 12 and 13, which telescope, or slide, in guideways or recesses in the main portion of the sight bar. The prism and its supporting adjuncts may be regarded as an extension of the sight bar. One of the legs is marked off in suitable units so that when the prism is adjusted to its final position, a reading may be taken under an index arrow 14 and this reading will indicate, in feet, the distance from the sight bar to the object at 2.

A mirror 15, divided through its middle by a vertical cross-hair 16, is provided to assist in bringing the camera to the proper position for taking the reading. This mirror is mounted in a box 17, supported on an arm 18, which slides into a recess in the main body of the bar when the apparatus is being folded up for storage in the tray 4. Fig. 3 shows these several parts pushed together into small compass and ready to be folded down into the top of the camera. As shown in Fig. 4, the leg 12 is adapted to slide forward, thereby closing the outer, or exposed, portion of the sight box.

To take a reading with the apparatus above described, the operator holds the sight bar with the cross-hair or sight line 5 in direct alinement between the eye at 1 and the object at 2, the camera being then adjusted about a vertical axis until the eye of the observer is reflected in the mirror 7 and is there bisected by the cross-hair 5. The camera is then moved toward or from the observer until the observer's eye is reflected also in mirror 15 and is there bisected by cross-hair 16. The sight bar will then be in position for taking a reading. Preferably, the angular setting of mirror 15, and its distance from the sight box, are such that the sight bar is in position for a reading when at a distance of about eighteen inches from the eye of the observer and standing at right angles to the direct line of sight from the eye to the object.

To take the reading, the prism 10 is slid in or out until the object at 2 appears therein in alinement with a cross-hair 20, or other suitable mark on the prism. It is then only necessary for the observer to read the scale below the index 14. This scale is preferably calibrated in feet and indicates the distance from the scale to the object. In some of the other modifications, where the structures are not intended primarily for use with a camera, the scale may be calibrated to denote the distance to the object from the eye of the observer.

The structure illustrated in Fig. 7 is of somewhat more massive build than that heretofore described and comprises a plate 21, which may be a portion of a receiving tray, or may be simply a handle by which the sight bar can be conveniently held. The sight bar has, near one end, a sight opening 22 of triangular outline, bisected by a cross-hair 23 and arranged immediately above a reflecting mirror 24, the functions of which are the same as those of mirror 7 of Fig. 2. The light-deflecting prism 25 and its cross-hair 26 are mounted in a box 27, which is arranged as a rider for a vertical plate 28, whereon the calibrated scale is laid out. A mirror box 29, carrying an angularly mounted mirror 30, bisected by a cross-hair 31, is mounted on an arm 32, adapted to telescope into the main portion of the sight bar. Plate 28, whereon the prism slides, is attached to the mirror box 29 and moves therewith. It will be understood that in this modification, as in Fig. 2, the mirrors, carried by the extensions of the bar, are in position for use when they are pulled out to the limit of their movement.

The operation of the structure shown in Fig. 7 is similar to that above set forth, except that in this case the scale is stationary and the readings are taken off immediately below the cross-hair of the movable prism.

Figs. 8, 9 and 10 show a modification adapted to fold into small compass and particularly characterized by a prism of such angular width and of such length that readings may be taken without movement of the prism with respect to the calibrated scale. In this modification, the sight bar comprises a box 33, from which the sight box 34 and its mirror 35 may be pulled out to the left where it is supported by a vertical plate 36, which initially formed a cover or closure for the prism box. In this modification, the sight box is equipped with an ordinary globe sight 37.

The angular mirror 38, used in adjusting the position of the sight bar, is carried on a slide 39, which pulls out from the other end of box 33, simultaneously exposing the back of the prism 40. This prism preferably has an angular width of 30 degrees and is mounted immediately above the calibrated scale 41. In taking a reading, the operator follows the general procedure above outlined, but there need be no movement of the prism or of the scale. The operator sees in the prism the image of the distant object and takes the reading immediately below the center of that image. This reading is the distance to the object.

The modifications shown in Figs. 11 and 12 show the structure just described, mounted for use in the top of a camera box. The central member 33 fits loosely in a depressed recess 42 in the camera top and is equipped with a leaf-spring 43, whereby it can be forced up into the position shown in Fig. 12 and there expanded, as illustrated in Fig. 9. When the finder is stored in the camera top, as indicated in Fig. 11, it is held therein by turn-buttons or clips 44.

The modification illustrated in Figs. 13, 14 and 15 comprises a sight bar having a thick portion 45, adapted to shield a stationary prism 46, said bar having a narrow portion 47 carrying the sight box 48 and also serviceable as a cover for protecting the prism when the latter is not in use. A pivoted plate 49 is carried by the bar and can be folded over the back of the sight box. The calibrated scale of the instrument is arranged at 50 immediately below the prism and may be equipped with an index or pointer 51, movable along a slot 52. The angular mirror 53 is rigidly mounted in the end of the bar. A pivoted door 54 may be provided as a closure for the back of the prism box. Readings are taken as in the case of the structure illustrated in Figs. 8 to 10, inclusive.

The structure illustrated in Figs. 16 and 17, comprises a rigid sight bar 55, carrying at one end a sight box with a mirror 56 and cross-hair 57 and with a triangular opening 58 through which the distant object may be seen. At its other end, the bar carries an angular mirror 59, bisected by a cross-hair 60 for the purposes heretofore set forth. In place of a prism, this structure makes use of a pair of mirrors 61 and 62, set at an angle to one another, as indicated in Fig. 17, but also set at an angle to the axis of the mirror box with the result that light from a distant object is deflected and transmitted to the eye of the observer where it converges to meet the ray of light passing directly from the object through the sight box to the eye. With this modification the scale 63 is set at the back of the lower mirror and the readings are taken in the same general manner as with the modification shown in Fig. 9.

Figs. 18 to 23 inclusive disclose a modification wherein the sight bar is rigid but is provided with doors or covers arranged for protecting the delicate parts of the apparatus. This type is particularly adapted for carrying in the pocket and is rugged and durable in structure. The rigid sight 64 is closed at the back by a hinged door 65 which folds down over the prism opening. The front of the prism opening is equipped with a sliding door 66 having a thumb piece 67 by which it may be moved sidewise and carrying a rack 68 for engagement with a segmental gear 69 rigidly attached to the hinged door 65 in such manner that as the sliding door is moved to the left it automatically opens the hinged door, thereby uncovering the prism at both its faces. A leaf spring 70 engages with the segmental gear to insure retention of the door 65 in its open position after it has once been placed in that position.

The sight bar is provided with a long stationary prism 71 and with a coöperating calibrated scale for use as heretofore described. A mirror 73 is set in at an angle at the end of the bar and serves as a means for adjusting the angular position of the bar when in use for measuring distances according to the general method heretofore set forth.

The sight box 74 is set in a recess at the end of the sight bar and is of the general type illustrated in Fig. 14. A sheet metal box 75 is provided for covering this sight when it is not in use, this box comprising two sides and a bottom movable in grooved ways and having an arm 76 integral with the bottom and extending a considerable distance along the sight bar. At its end this arm 76 is equipped with an up-standing stop 77. A similar stop 78 is located near the middle of the arm. The stops coöperate with a lug 79 projecting rearwardly from door 66 in such a manner that when the door is moved to the left the lug 79 engages the stop 78 and then on further movement of the door pushes box 75 away from the sight opening thereby exposing the sight simultaneously with the exposure of the prism. On the return sliding movement of the door 66 the lug 79 engages with the stop 77 and draws the box 75 back to its initial or closed position. During this backward movement of door 66 the rack 68 is brought into mesh with the segmental gear 69 and the hinged door 65 closes down on the prism opening thereby completing the closure of the instrument and covering up all its exposed parts.

Although I have herein disclosed in detail the specific embodiments of my present invention, I am aware that many of the details of structure may be departed from and that other changes may be made without departing from the invention as defined by the appended claims.

What I claim as new and desire to secure by Letters Patent of the United States is:

1. In a distance finder, the combination of a sight-bar carrying a sight in alinement with which an observer may view a distant object, means carried by said bar for optically indicating to the operator the correct position of said bar with respect to the observer's eye, a light deflecting device carried by said bar, and a scale associated with said light deflecting device, said scale being calibrated to indicate distances to said distant object when the sight bar is in correct position before the eye of the observer and when the distant object is visible in its proper position in the light deflecting device.

2. In a distance finder, the combination of a sight which can be placed in alinement with a distant object, a light deflecting device at the side of said sight, a calibrated scale associated with said light deflecting device, and a mirror set at an angle to the operator's direct line of sight and in position for indicating to the operator the correct position of his eye with respect to the several elements of the distance finder.

3. A distance finder comprising a sight-bar carrying, at one end, a sight through which a distant object may be seen by the observer, a prism carried by said sight-bar and in position to deflect to the observer's eye light from said distant object, a mirror set at an angle to said sight-bar and in position to indicate to the observer the correct location of said sight-bar, and a scale coöperating with said prism and calibrated to indicate the distance to the object when its image is in correct relative position in the prism.

4. In a distance finder, the combination of a sight-bar carrying at one end a sight which may be placed in alinement with a distant object, a mirror below said sight for indicating the correct angular position of said bar with respect to the operator's line of sight to the distant object, a second mirror carried by said sight-bar and set at such an angle that the operator's eye is visible therein when the sight-bar is at normal distance from the operator's eye, a light deflecting device carried by said bar in such position that the distant object may be seen therethrough, and a scale calibrated to indicate the distance to said object when the sight-bar has been placed in adjustment for a reading.

5. In a distance finder, the combination of a sight-bar carrying at one end a sight, a mirror adjacent to said sight and set at right angles to the line of sight, a second mirror carried by said bar and operative to indicate the distance at which said bar should be held from the observer's eye, a prism movable with respect to said sight into such position that the distant object may be seen therethrough, and a scale coöperating with said prism and indicating directly the linear distance to said object.

6. In a distance finder, the combination of a sight-bar carrying a sight, a mirror adjacent to said sight, a prism carried by said bar, a second mirror set at an angle to said bar, and a calibrated scale operative in conjunction with said prism, said distance finder having means for covering and protecting the more fragile parts thereof when the device is not in use.

7. In a distance finder, the combination of a sight bar carrying a sight, a mirror adjacent to said sight for locating the proper angular position of said sight bar before the eye of the observer, means for fixing the distance between the bar and the eye of the observer, a prism adjustable toward and from said sight, and a calibrated scale operative in conjunction with said prism to indicate the distance to a distant object.

In witness whereof, I hereunto subscribe my name this 6th day of September A. D. 1911.

JAMES MURRAY WASHBURN.

Witnesses:
 CAROLYN WEBER,
 ARBA B. MARVIN.